United States Patent
Wong et al.

(10) Patent No.: US 11,017,495 B2
(45) Date of Patent: May 25, 2021

(54) SYSTEMS, PROCESSES, AND COMPUTER PROGRAM PRODUCTS FOR ACCELERATION OF BIT-PER-PIXEL FILL TRANSFERS IN A GRAPHICS RENDERING SYSTEM

(71) Applicant: KYOCERA Document Solutions Inc., Osaka (JP)

(72) Inventors: Kendrick Esperanza Wong, Torrance, CA (US); Masayoshi Nakamura, Osaka (JP)

(73) Assignee: KYOCERA Document Solutions Inc.

( * ) Notice: Subject to any disclaimer, the term of this patent is extended or adjusted under 35 U.S.C. 154(b) by 0 days.

(21) Appl. No.: 16/595,985

(22) Filed: Oct. 8, 2019

(65) Prior Publication Data
US 2021/0104011 A1 Apr. 8, 2021

(51) Int. Cl.
*G09G 5/393* (2006.01)
*G06T 1/60* (2006.01)

(52) U.S. Cl.
CPC ...................... *G06T 1/60* (2013.01)

(58) Field of Classification Search
CPC .......... G06F 12/04; G06F 13/28; G06F 9/355; G06T 1/60; G09G 5/393; G09G 2360/127; G09G 5/395; G09G 2340/04
See application file for complete search history.

(56) References Cited

U.S. PATENT DOCUMENTS

| | | | |
|---|---|---|---|
| 5,706,483 A * | 1/1998 | Patrick | G06F 8/443 345/562 |
| 2004/0012829 A1 | 1/2004 | Takahashi | |
| 2006/0044603 A1* | 3/2006 | Meeker | G06F 3/1284 358/1.15 |

* cited by examiner

*Primary Examiner* — Hau H Nguyen
(74) *Attorney, Agent, or Firm* — Law Office of Alexis J. Saenz

(57) ABSTRACT

Embodiments improve processing of data by determining if a read-modify-write operation on a frame is necessary or not. Some frames may be converted into a block of 8 bpp data. There may be no need to read the destination since the unnecessary pixels may be protected by the byte-enables. The burst write transfer may be performed for the entire frame when it is 8 bpp depth. An original transfer frame may be split into smaller portions of the frame. One or more of the smaller frame portions may be converted into byte alignment thus obviating the need for the read function to be performed on the smaller frame portions. Accordingly, significant bits of data are no longer processed under this operation which speeds up the overall processing of data. Portions of transfer frames that may not be converted to 8 bpp may be processed with read-modify-write operations.

17 Claims, 5 Drawing Sheets

Case 3 Condition: ((PA%8) == 0) && (((PA+FW)%8) != 0)

Split the Frame into 2:
PA2 = PA
FW2 = ROUNDDOWN(FW / 8) * 8
PA3 = PA2 + FW2
FW3 = FW - FW2

Convert Frame2 to 8bpp:
PA2_8bpp = PA2 / 8
FW2_8bpp = FW2 / 8

Case 4 Condition: ((PA%8) ==0) && (((PA+FW)%8) == 0)

No Spiltting
PA2 = PA
FW2 = FW

Convert Frame 2 to 8bpp:
PA2_8bpp = PA2 / 8
FW2_8bpp = FW2 / 8

US 11,017,495 B2

SYSTEMS, PROCESSES, AND COMPUTER PROGRAM PRODUCTS FOR ACCELERATION OF BIT-PER-PIXEL FILL TRANSFERS IN A GRAPHICS RENDERING SYSTEM

CROSS-REFERENCE TO RELATED APPLICATION

None.

FIELD

The subject disclosure relates to graphics rendering and more particularly to systems, processes, and computer program products for acceleration of bit-per-pixel fill transfers in a graphics rendering system.

BACKGROUND

The Graphics Execution Unit (GEU) is a sophisticated multicore coprocessor optimized to render page images using graphics orders. A GEU improves system performance by offloading computation-intensive rendering operations from the CPU. A transfer frame describes a contiguous, rectangular area of pixels. A transfer frame is defined by two graphics order operands, a frame width and a frame height.

The GEU can fill the destination with a constant value. The GEU can process pixel depth of 8 bpp (bits-per-pixel) data with a constant 8-bit value; and 1 bpp data with 0 or 1 value. The GEU uses the pixel address (PA) to determine the location of where to put the transfer frame. The pixel address is treated differently based on the operation mode. The location of pixel data in the memory is byte addressed. FIG. 1 shows how memory addresses relate to pixel addresses. For 1 bpp mode, the upper 29 most significant bits of the pixel address indicates the memory address. Then the 1 bpp data is aligned within the byte based on the 3 least significant bits of its pixel address. For example, the 1 bpp pixel addresses 0x20 through 0x3F are contained in the byte at memory address 0x4.

For 8 bpp mode, the pixel addresses have the same value to its memory addresses.

When writing a block of 1 bpp data, the bits are packed into bytes before writing them into the memory. A read-modify-write operation is performed to avoid overwriting the unnecessary pixels, in bit unit, within the byte. The read-modify-write is performed for the entire frame.

SUMMARY

In one aspect of the disclosure, a method of increasing rendering performance by a processing unit is disclosed. The method comprises receiving a transfer frame of pixels of a one bit per pixel (bpp) depth; determining a frame width of the transfer frame of pixels; determining a pixel address of the transfer frame of pixels; converting at least a portion of the transfer frame of pixels into a burst writable frame by dividing the frame width and the pixel address until at least a portion of the frame width is byte aligned and the pixel address is byte-aligned; and performing a burst write transfer operation on the converted at least portion of the transfer frame of pixels.

In another aspect of the disclosure, a computer program product to increase rendering performance by a processing unit is disclosed. The computer program product comprises a non-transitory computer readable storage medium having computer readable program code embodied therewith. The computer readable program code is configured, when executed by a processor, to: receive a transfer frame of pixels of a one bit per pixel (bpp) depth; determine a frame width of the transfer frame of pixels; determine a pixel address of the transfer frame of pixels; convert at least a portion of the transfer frame of pixels into a burst writable frame by dividing the frame width and the pixel address until at least a portion of the frame width is byte aligned and the pixel address is byte-aligned; and perform a burst write transfer operation on the converted at least portion of the transfer frame of pixels.

In yet another aspect, a computing apparatus is disclosed. The computing apparatus, comprises an image rendering unit; a memory storage unit; and a processing unit coupled to the image rendering unit and to the memory storage unit, wherein computer readable program code in the memory storage unit is configured to increase rendering performance in output displayed by the image rendering unit, by controlling the processing unit to: receive a transfer frame of pixels of a one bit per pixel (bpp) depth; determine a frame width of the transfer frame of pixels; determine a pixel address of the transfer frame of pixels; convert at least a portion of the transfer frame of pixels into a burst writable frame by dividing the frame width and the pixel address until at least a portion of the frame width is byte aligned and the pixel address is byte-aligned; and perform a burst write transfer operation on the converted at least portion of the transfer frame of pixels.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of data processing.

Generally, embodiments of the subject technology provide improved speed of data processing by eliminating a problem during the read-write-modify operation. The problem involves the GEU getting hung up on for example, the AXI 128-bit data bus with byte enables. As will be appreciated, when writing a block of 8 bpp data, one may recognize after reading the subject disclosure that there is no need to read the destination since the unnecessary pixels, in the byte unit, are protected by the byte-enables. The burst write transfer may be performed for the entire frame. Thus, in an exemplary embodiment, aspects of the subject disclosure increase performance in filling a 1 bpp constant value to the destination by analyzing the 1 bpp pixel address and the frame width (FW). Embodiments may determine if a read-modify-write operation on a frame is necessary or not. The original transfer frame may be split into smaller portions of the frame. One or more of the smaller frame portions may be converted into byte alignment thus obviating the need for the read function for this (or these) frame(s) portions. Accordingly, significant bits of data are no longer processed under this operation speeding up the overall processing of data.

In an exemplary embodiment, a method increases performance in filling a 1 bpp constant value to the destination by analyzing the 1 bpp pixel address (PA) and frame width (FW) to determine if a read-modify-write operation is necessary or not. The frame can be split into, for example, 2~3 smaller frames based on the alignment of the PA and the FW, which are divided up based on different starting conditions as described below:

Case 1: PA and PA+FW are Both not Byte-Aligned.

Figure 1:
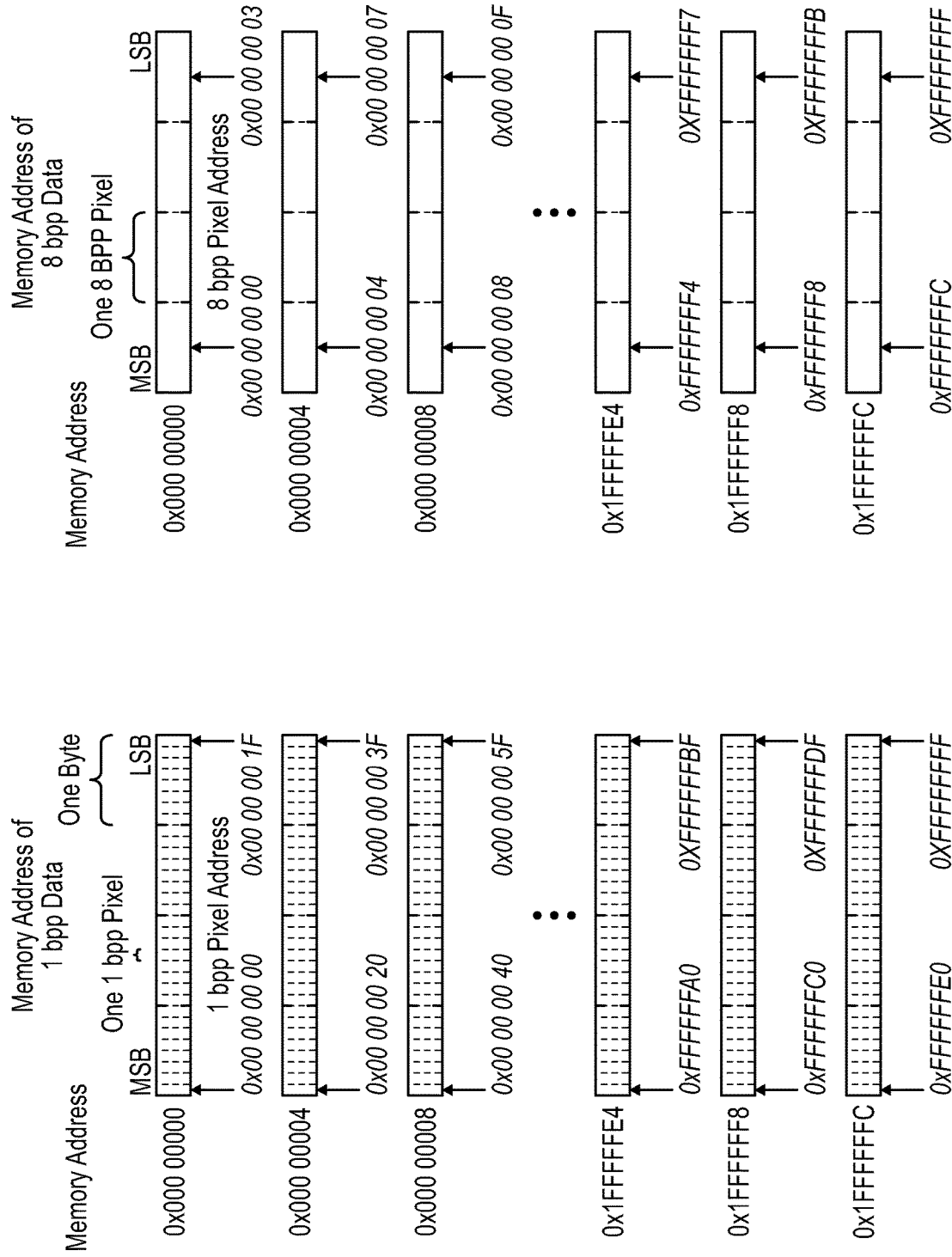
FIG. 1 is a diagrammatic view showing how memory addresses relate to pixel addresses.
Figure 2:
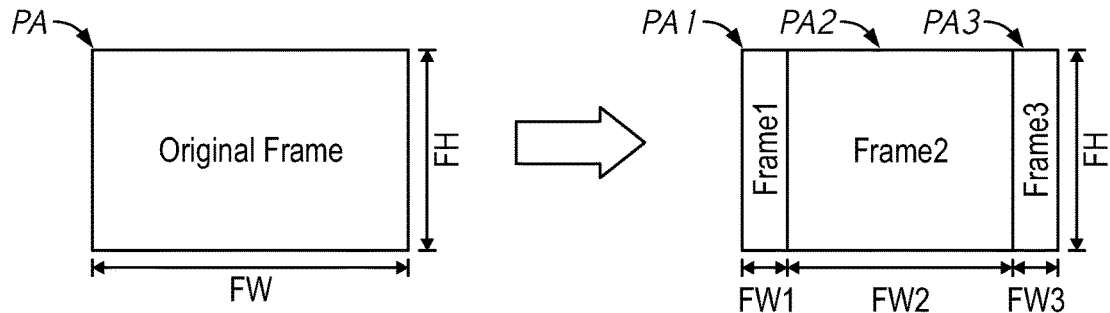
FIG. 2 is a diagrammatic view showing how to convert a transfer frame when pixel address and the pixel address added to the frame width are both not byte-aligned in accordance with embodiments of the subject technology.

Referring to FIG. 2, in a first example scenario, the transfer frame's PA and PA+FW are both not byte-aligned.

A method may divide the transfer frame into 3 portions (sub-frames of the original frame being processed). The first sub-frame's width may be based on the PA's 3 least significant bits subtracted from 8. The second sub-frame's width may have the remaining byte-aligned width after the original frame's width is subtracted by the first frame's width. The third sub-frame may have the remaining non-byte-aligned width after the original frame's width is subtracted by the first and second sub-frames' width. The first and third sub-frames may still undergo a read-modify-write operation. The second sub-frame may be converted from 1 bpp to 8 bpp by dividing the PA and the FW by 8. As may be appreciated, read transfer operations for the converted second sub-frame may be eliminated. Accordingly, the second sub-frame may be processed using just write burst transfers.

Case 2: PA is not Byte-Aligned but PA+FW is Byte-Aligned.

Figure 3:
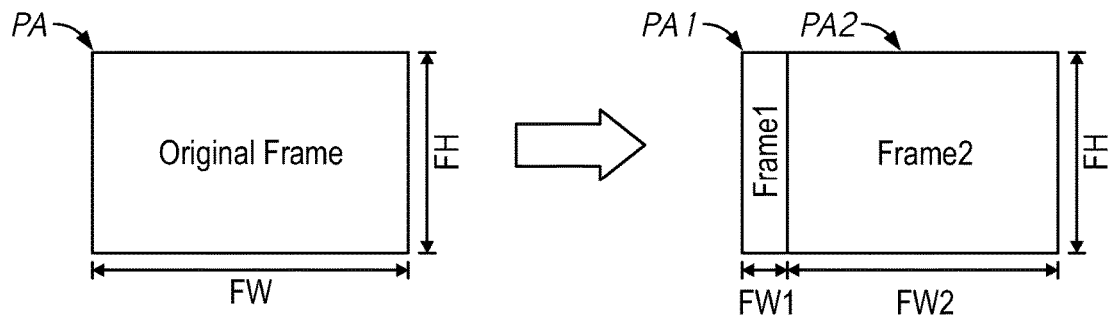
FIG. 3 is a diagrammatic view showing how to convert a transfer frame when pixel address is not byte-aligned but the pixel address added to the frame width is byte-aligned in accordance with embodiments of the subject technology.

Referring to FIG. 3, in a second example scenario, the transfer frame's PA is not byte-aligned but the PA+FW are both byte-aligned.

A method may divide the transfer frame into 2 sub-frames. The first sub-frame's width may be based on the PA's 3 least significant bits subtracted from 8. The second sub-frame's width may have the remaining byte-aligned width after the original frame's width is subtracted by the first sub-frame's width. The first sub-frame may undergo a read-modify-write operation. The second sub-frame may be converted from 1 bpp to 8 bpp by dividing the PA and the FW by 8 to eliminate the read transfers and just issue write burst transfers.

Case 3: PA is Byte-Aligned but PA+FW is not Byte-Aligned.

Figure 4:
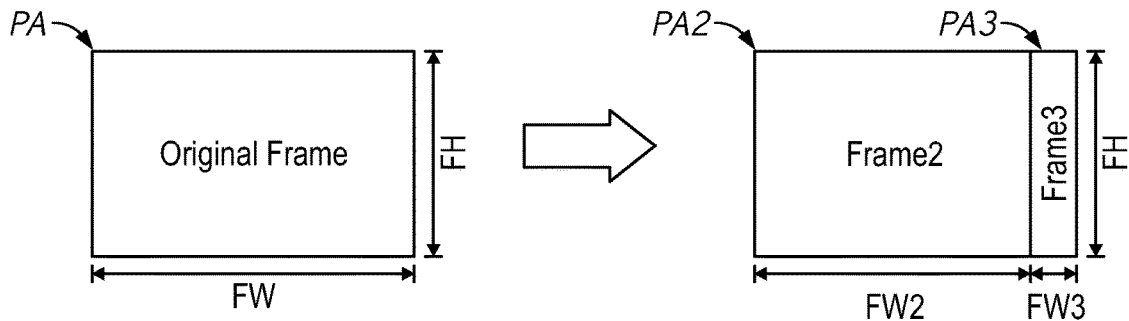
FIG. 4 is a diagrammatic view showing how to convert a transfer frame when pixel address is byte-aligned but the pixel address added to the frame width is not byte-aligned in accordance with embodiments of the subject technology.

Referring to FIG. 4, in a third example scenario, the transfer frame's PA is byte-aligned but the PA+FW are not byte-aligned.

A method may divide the transfer frame into 2 sub-frames. The width of the first sub-frame, (labeled named "Frame 2" in this depiction), may have original transfer frame's width rounded down to the nearest 8 to make it byte-aligned. The second sub-frame, (labeled named "Frame 3" in this depiction), may have the remaining non-byte-aligned width after the original transfer frame's width is subtracted by the first sub-frame's width. The first sub-frame may be converted from 1 bpp to 8 bpp by dividing PA and FW by 8 to eliminate the read transfers and just issue write burst transfers. The second sub-frame may undergo read-modify-write operations. It is noted that for purposes of an automated process described further below, the labels used in this case description may vary. For example, the "first sub-frame" described here may be the "second sub-frame" for purposes of consistent labelling in the overall process. Likewise, the "second sub-frame" described here may be the "third sub-frame" in the overall process.

Case 4: PA and PA+FW are Both Byte-Aligned.

Figure 5:
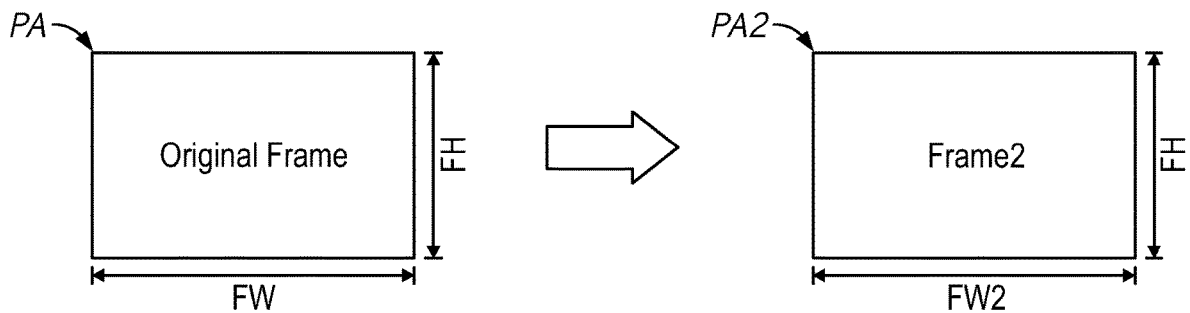
FIG. 5 is a diagrammatic view showing how to convert a transfer frame when the pixel address and the pixel address added to the frame width are both byte-aligned in accordance with embodiments of the subject technology.

Referring to FIG. 5, in a fourth example scenario, the transfer frame's PA and the PA+FW are both byte-aligned.

A method may convert the transfer frame from 1 bpp to 8 bpp by dividing the PA and the FW by 8 to eliminate all the read transfers and just issue write burst transfers.

In general, converting a transfer frame (or a portion of the original transfer frame that has become byte-aligned), from 1 bpp to 8 bpp, the mode is changed from 1 bpp to 8 bpp. The 8 pixels of 1 bpp fill data are packed into one byte. The 1 bpp fill of zeroes will become 8 zeroes, or 8'h00. The 1 bpp fill of ones will become 8 ones, or 8'hFF. The frame width and pixel address are divided by 8.

Figure 6:
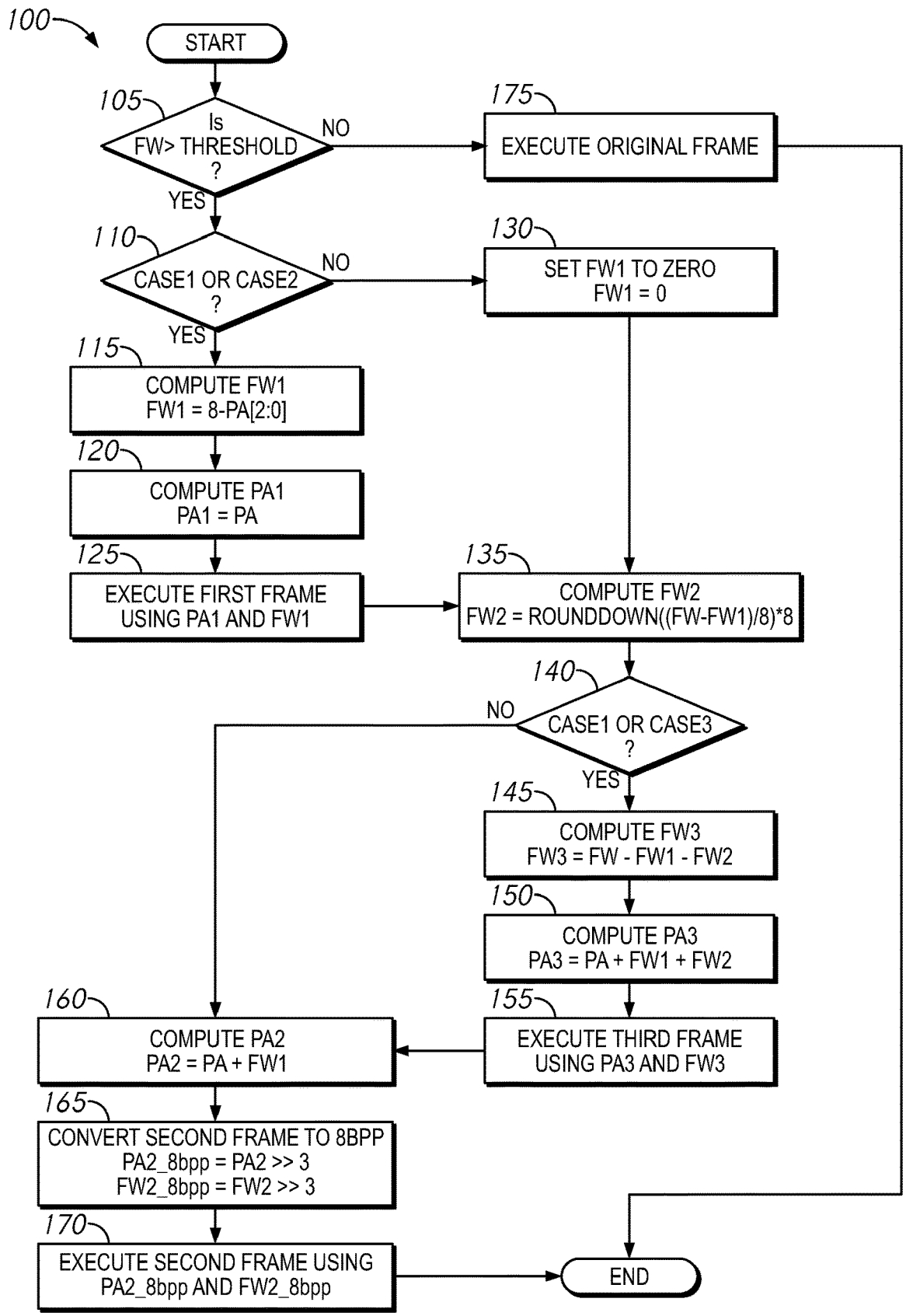
FIG. 6 is a flowchart for a method of increasing rendering performance by a processing unit in accordance with embodiments of the subject technology.

In an exemplary embodiment, all four cases above can be unified into a single method 100 of increasing rendering performance by a processing unit shown as shown in FIG. 6. As an initial step, a transfer frame may be checked to determine 105 whether the frame width meets a threshold data size before checking for these four cases. This is because the checking of the four conditions, splitting of the frame, and converting from 1 bpp to 8 bpp might take longer than executing 175 the original frame "as-is". The threshold is programmable in order to control the activation of the acceleration mechanism to achieve the desired performance. In a test run, a target performance was achieved by setting the threshold to 512, which is 4 times the data bus width.

The method 100 may generally receive a transfer frame which may be classified according to the scenarios described above. Once classified, the method 100 may determine 110 whether the transfer frame meets the conditions of Case 1 or Case 2 described above. If so, then the method 100 may process the transfer according to the description above. For example, after dividing the transfer frame, the first frame portion or sub-frame) may be computed 115 by subtracting the pixel address' 3 least significant bits from 8. The pixel address of the first sub-frame may be computed 120 by setting it to the pixel address of the original transfer frame. The first sub-frame may be executed (or processed) 125 using the pixel address and the frame width of the first sub-frame. Thus, the first sub-frame (labeled as "Frame1" in FIGS. 2 and 3) may undergo the read-modify-write operation, however with less data being processed than the original transfer frame.

If the determination in block 110 resulted in the conditions not being Case 1 or Case 2, then the method 100 may set 130 the value for the first sub-frame to zero.

Once the values associated with the first sub-frame are determined, the method 100 may continue by computing 135 the frame width of the second sub-frame (labeled as "Frame2" in FIGS. 2-5). The first sub-frame's width may have the original transfer frame's width rounded down to the nearest eight to make it byte-aligned. The second sub-frame width may comprise the remaining non-byte-aligned width data after the first sub-frame's width is subtracted from the original transfer frame's width.

The method 100 may determine 140 whether the transfer frame meets the conditions for Case 1 or Case 3. If so, then the frame width for the third sub-frame may be computed 145. The third sub-frame (labeled as "Frame3" in FIGS. 2 and 4) in both instances, may be pixels from the remaining number of bits in the transfer frame width after determining the frame width of the first sub-frame of pixels and determining the frame width of the second sub-frame of pixels (if necessary). For example, in Case 1, there are three sub-frames generated by the division of the original transfer frame. However, in Case 3, since the frame width value of the first sub-frame was set to zero, the frame width of the third sub-frame is based on the pixels that remain after the second sub-frame is determined. The pixel address for the third sub-frame may be computed 150, which may be based on the pixel address of the original transfer frame plus the frame width of the first sub-frame and the frame width of the second sub-frame. The third sub-frame may be processed 155 using read-modify-write operations using the third sub-frame's frame width and pixel address.

The method 100 may continue at block 160 after the third sub-frame values are determined or after it was determined in block 140 that neither Case 1 or Case 3 applied.

The pixel address of the second sub-frame may be computed 160 by adding the original transfer frame's pixel address to the frame width of the first sub-frame. The second sub-frame, now being byte-aligned, may be converted 165 from 1 bpp to 8 bpp by dividing the PA and the FW by 8 to eliminate the read transfers and just issue write burst transfers during processing 170 of the second sub-frame.

Figure 7:
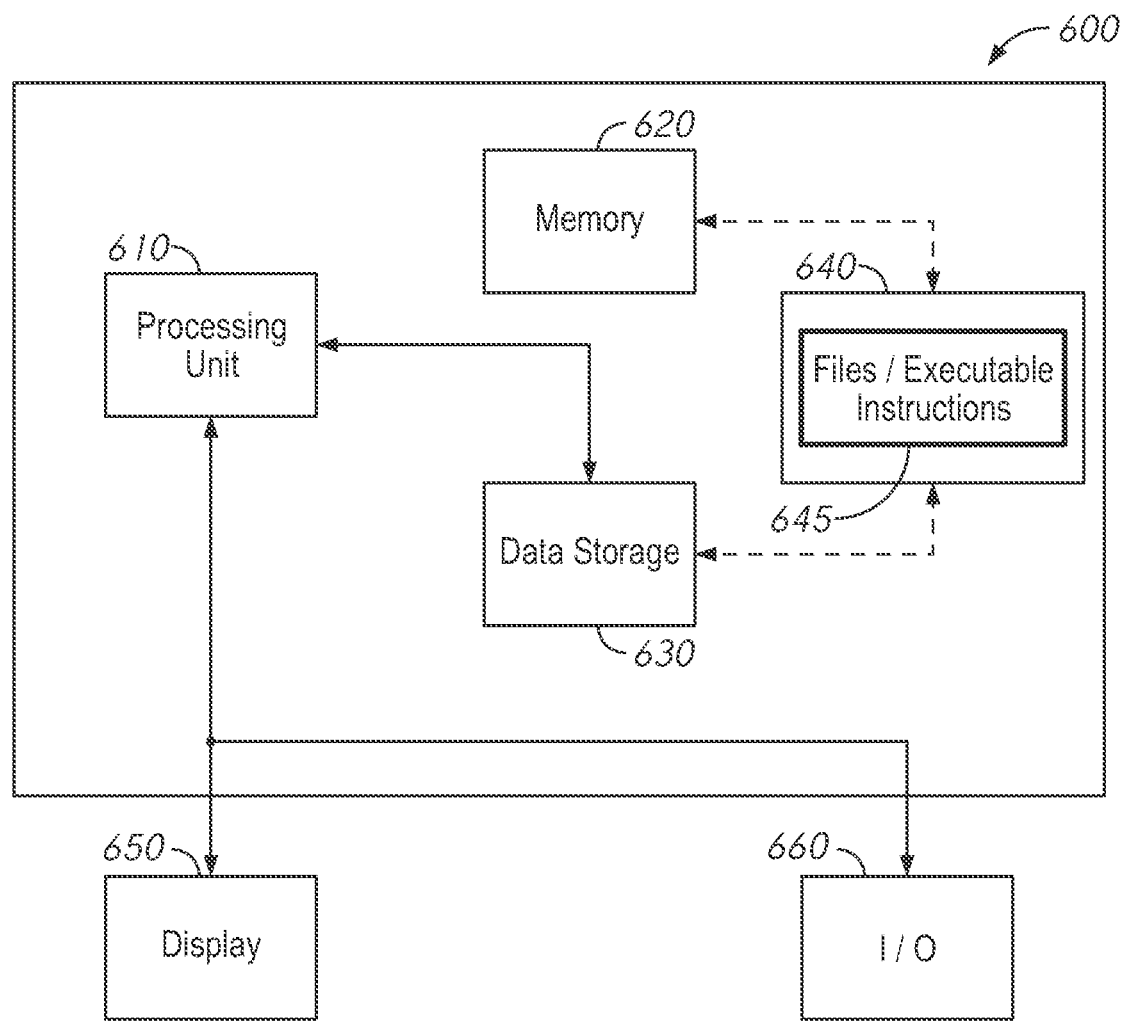
FIG. 7 is a block diagram of a computing device in accordance with an aspect of the subject technology.

Referring now to FIG. 7, a schematic example of a computing device 600 is shown according to an exemplary embodiment. In general, the process(es) described above may be implemented by the computing device 600.

The computing device 600 may be for example, a computer system or a computer server. As will be appreciated, some aspects of the embodiments disclosed above may turn the computing device 600 into a special purpose computer system. For example, in the role of a host server, the computing device 600 may implement for example the functions of processing data as described above for large-scale graphics applications. In the role of a user device, the computing device 600 is generally not a server but may instead be desktop computers, tablet or laptop computers, all-in-one computer stations, a mobile computing device (for example, a smart phone, smart wearable devices (glasses, jewelry, watches, ear wear, etc.), or programmable electronics.

The components of the computing device 600, may include, but are not limited to, one or more processors or processing units 610, a system memory 620, data storage 630, a computer program product 640 having a set of program modules 645 including files and executable instructions, and a bus system that couples various system components including the system memory 620 to the processor(s) 610. The memory storage 620 may store for example, electronic files of the smart contract criteria and print advertisement content. In some embodiments, the processors 610 may include a processing unit dedicated to graphics and image processing (for example a graphics processing unit (GPU) or visual processing unit (VPU). As a GPU or VPU, the processor 610 may implement executable instructions focused on image processing applications either alone or in coordination with other general processor 610 types such a CPUs, microchips, and the like.

The computing device 600 may be described in the general context of computer system executable instructions, such as the program modules 645 which represent a software embodiment of the system and processes described generally above with respect to FIGS. 2-6. The program modules 645 generally carry out the functions and/or methodologies of embodiments as described above. The computing device 600 may typically include a variety of computer system readable media. Such media could be chosen from any available media that is accessible by the computing device 600, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 620 could include one or more computer system readable media in the form of volatile memory, such as a random-access memory (RAM) and/or a cache memory. By way of example only, the data storage system 630 may read from and write to a non-removable, non-volatile magnetic media device. The system memory 620 may include at least one program product 640 having a set (e.g., at least one) of program modules 645 that are configured to carry out the functions of embodiments of the invention in the form of computer executable instructions. The program product/utility 640, having a set (at least one) of program modules 645, may be stored in the system memory 620 by way of example, and not limitation, as an operating system, one or more application programs, other program modules, and program data.

The computing device 600 may communicate with one or more external devices including for example, an electronic display 650 which may in some embodiments be configured for tactile response as in a touch screen display. User input into the display 650 may be registered at the processor 610 and processed accordingly. Other devices may enable the computing device 600 to communicate with one or more other computing devices, either by hardwire or wirelessly.

Such communication can occur via Input/Output (I/O) interfaces/ports 660. The computing device 600, through the I/O interface/ports 660, may communicate with one or more networks such as a local area network (LAN), a general wide area network (WAN), and/or a public network (e.g., the Internet) via a network adapter as is commonly known in the art.

Each of the operating system, one or more application programs, other program modules, and program data or some combination thereof, may include an implementation of a networking environment. In some embodiments, the computing device 600 may be a cloud computing node connected to a cloud computing network (not shown). The computing device 600 may be practiced in distributed cloud computing environments where tasks are performed by remote processing devices that are linked through a communications network. In a distributed cloud computing environment, program modules may be located in both local and remote computer system storage media including memory storage devices.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 650 which may be controlled via direct contact with the display 650 or via the I/O interfaces 660 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 610 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of increasing rendering performance by a processing unit, comprising:
    receiving a transfer frame of pixels of a one bit per pixel (bpp) depth;
    determining a frame width of the transfer frame of pixels;
    determining a pixel address of the transfer frame of pixels;
    converting at least a portion of the transfer frame of pixels into a burst writable frame by dividing the frame width and the pixel address until at least a portion of the frame width is byte aligned and the pixel address is byte-aligned;
    performing a burst write transfer operation on the converted at least portion of the transfer frame of pixels; and wherein the pixel address is byte-aligned and the frame width added to the pixel address is not byte-aligned, further comprising:
  dividing the transfer frame of pixels into two sub-frames;
  transforming a first sub-frame of pixels into a byte-aligned state with the pixel address by rounding down a width of the first sub-frame to a nearest eighth of the transfer frame's frame width;
  generating a second sub-frame of pixels using a remaining width of the transfer frame's frame width left after the transformation of the first sub-frame; and
  performing the burst write transfer operation on the first sub-frame of pixels.

2. The method of claim 1, wherein in response to the frame width and the pixel address being byte-aligned, dividing the at least a portion of the frame width and the pixel address to eight bpp depth before performing the burst write transfer operation.

3. The method of claim 1, wherein the pixel address is byte-aligned and the frame width added to the pixel address is not byte-aligned, further comprising dividing the transfer frame of pixels into at least two sub-frames of pixels, wherein a first sub-frame of pixels is byte-aligned and performing the burst write transfer operation on the first sub-frame of pixels.

4. The method of claim 1, wherein the pixel address is not byte-aligned but the frame width added to the pixel address is byte-aligned, further comprising:
  dividing the transfer frame of pixels into two sub-frames;
  generating a first sub-frame of pixels including a first sub-frame width based on a least three significant bits of the pixel address subtracted from eight;
  generating a second sub-frame of pixels from a remaining number of bits in the transfer frame width after the step of generating the first sub-frame of pixels, wherein the second sub-frame of pixels includes a second sub-frame width being byte aligned; and
  performing the write burst transfer operation on the second sub-frame of pixels.

5. The method of claim 1, wherein the pixel address is not byte-aligned and the frame width added to the pixel address is not byte-aligned, further comprising:
  dividing the transfer frame of pixels into three sub-frames;
  generating a first sub-frame of pixels including a first sub-frame width based on a least three significant bits of the pixel address subtracted from eight;
  generating a second sub-frame of pixels from a remaining number of bits in the transfer frame width after the step of generating the first sub-frame of pixels, wherein the second sub-frame of pixels includes a second sub-frame width being byte-aligned;
  generating a third sub-frame of pixels from the remaining number of bits in the transfer frame width after the step of generating the first sub-frame of pixels and the step of generating the second sub-frame of pixels, wherein the third sub-frame of pixels includes a third sub-frame width; and
  performing the write burst transfer operation on the second sub-frame of pixels.

6. The method of claim 1, further comprising determining whether a data size of the transfer frame meets a threshold value prior to converting at least a portion of the transfer frame of pixels into a burst writable frame.

7. A computer program product to increase rendering performance by a processing unit, the computer program product comprising a non-transitory computer readable storage medium having computer readable program code embodied therewith, the computer readable program code being configured, when executed by the processing unit, to:
  receive a transfer frame of pixels of a one bit per pixel (bpp) depth;
  determine a frame width of the transfer frame of pixels;
  determine a pixel address of the transfer frame of pixels;
  convert at least a portion of the transfer frame of pixels into a burst writable frame by dividing the frame width and the pixel address until at least a portion of the frame width is byte aligned and the pixel address is byte-aligned;
  perform a burst write transfer operation on the converted at least portion of the transfer frame of pixels; and
  wherein the pixel address is not byte-aligned but the frame width added to the pixel address is byte-aligned, the computer readable program code is further configured to:
    divide the transfer frame of pixels into two sub-frames;
    generate a first sub-frame of pixels including a first sub-frame width based on a least three significant bits of the pixel address subtracted from eight;
    generate a second sub-frame of pixels from a remaining number of bits in the transfer frame width after the step of generating the first sub-frame of pixels, wherein the second sub-frame of pixels includes a second sub-frame width being byte aligned; and
    perform the write burst transfer operation on the second sub-frame of pixels.

8. The computer program product of claim 7, wherein in response to the frame width and the pixel address being byte-aligned, the computer readable program code is further configured to divide the at least a portion of the frame width and the pixel address to eight bpp depth before performing the burst write transfer operation.

9. The computer program product of claim 7, wherein the pixel address is byte-aligned and the frame width added to the pixel address is not byte-aligned, and the computer readable program code is further configured to:
  divide the transfer frame of pixels into at least two sub-frames of pixels, wherein a first sub-frame of pixels is byte-aligned; and
  perform the burst write transfer operation on the first sub-frame of pixels.

10. The computer program product of claim 7, wherein the pixel address is byte-aligned and the frame width added to the pixel address is not byte-aligned, and the computer readable program code is further configured to:
  divide the transfer frame of pixels into two sub-frames;
  transform a first sub-frame of pixels into a byte-aligned state with the pixel address by rounding down a width of the first sub-frame to a nearest eighth of the transfer frame's frame width;
  generate a second sub-frame of pixels using a remaining width of the transfer frame's frame width left after the transformation of the first sub-frame; and
  perform the burst write transfer operation on the first sub-frame of pixels.

11. The computer program product of claim 7, wherein the pixel address is not byte-aligned and the frame width added to the pixel address is not byte-aligned, and the computer readable program code is further configured to:

divide the transfer frame of pixels into three sub-frames;
generate a first sub-frame of pixels including a first sub-frame width based on a least three significant bits of the pixel address subtracted from eight;
generate a second sub-frame of pixels from a remaining number of bits in the transfer frame width after the step of generating the first sub-frame of pixels, wherein the second sub-frame of pixels includes a second sub-frame width being byte-aligned;
generate a third sub-frame of pixels from the remaining number of bits in the transfer frame width after the step of generating the first sub-frame of pixels and the step of generating the second sub-frame of pixels, wherein the third sub-frame of pixels includes a third sub-frame width; and
perform the write burst transfer operation on the second sub-frame of pixels.

12. The computer program product of claim 11, further comprising computer readable program code further configured to determine whether a data size of the transfer frame meets a threshold value prior to converting at least a portion of the transfer frame of pixels into a burst writable frame.

13. A method of increasing rendering performance by a processing unit, comprising:
receiving a transfer frame of pixels of a one bit per pixel (bpp) depth;
determining a frame width of the transfer frame of pixels;
determining a pixel address of the transfer frame of pixels;
converting at least a portion of the transfer frame of pixels into a burst writable frame by dividing the frame width and the pixel address until at least a portion of the frame width is byte aligned and the pixel address is byte-aligned; and
performing a burst write transfer operation on the converted at least portion of the transfer frame of pixels; and
wherein the pixel address is not byte-aligned and the frame width added to the pixel address is not byte-aligned, further comprising:
dividing the transfer frame of pixels into three sub-frames;
generating a first sub-frame of pixels including a first sub-frame width based on a least three significant bits of the pixel address subtracted from eight;
generating a second sub-frame of pixels from a remaining number of bits in the transfer frame width after the step of generating the first sub-frame of pixels, wherein the second sub-frame of pixels includes a second sub-frame width being byte-aligned;
generating a third sub-frame of pixels from the remaining number of bits in the transfer frame width after the step of generating the first sub-frame of pixels and the step of generating the second sub-frame of pixels, wherein the third sub-frame of pixels includes a third sub-frame width; and
performing the write burst transfer operation on the second sub-frame of pixels.

14. The method of claim 13, wherein in response to the frame width and the pixel address being byte-aligned, the computer readable program code is further configured to divide the at least a portion of the frame width and the pixel address to eight bpp depth before performing the burst write transfer operation.

15. The method of claim 13, wherein the pixel address is byte-aligned and the frame width added to the pixel address is not byte-aligned, and the computer readable program code is further configured to:
divide the transfer frame of pixels into at least two sub-frames of pixels, wherein a first sub-frame of pixels is byte-aligned; and
perform the burst write transfer operation on the first sub-frame of pixels.

16. The method of claim 13, wherein the pixel address is byte-aligned and the frame width added to the pixel address is not byte-aligned, and the computer readable program code is further configured to:
divide the transfer frame of pixels into two sub-frames;
transform a first sub-frame of pixels into a byte-aligned state with the pixel address by rounding down a width of the first sub-frame to a nearest eighth of the transfer frame's frame width;
generate a second sub-frame of pixels using a remaining width of the transfer frame's frame width left after the transformation of the first sub-frame; and
perform the burst write transfer operation on the first sub-frame of pixels.

17. The method of claim 13, wherein the pixel address is not byte-aligned but the frame width added to the pixel address is byte-aligned, and the computer readable program code is further configured to:
divide the transfer frame of pixels into two sub-frames;
generate a first sub-frame of pixels including a first sub-frame width based on a least three significant bits of the pixel address subtracted from eight;
generate a second sub-frame of pixels from a remaining number of bits in the transfer frame width after the step of generating the first sub-frame of pixels, wherein the second sub-frame of pixels includes a second sub-frame width being byte aligned; and
perform the write burst transfer operation on the second sub-frame of pixels.

* * * * *